No. 749,717. PATENTED JAN. 19, 1904.
T. L. CARPENTER.
FEED TROUGH.
APPLICATION FILED JUNE 29, 1903.
NO MODEL.
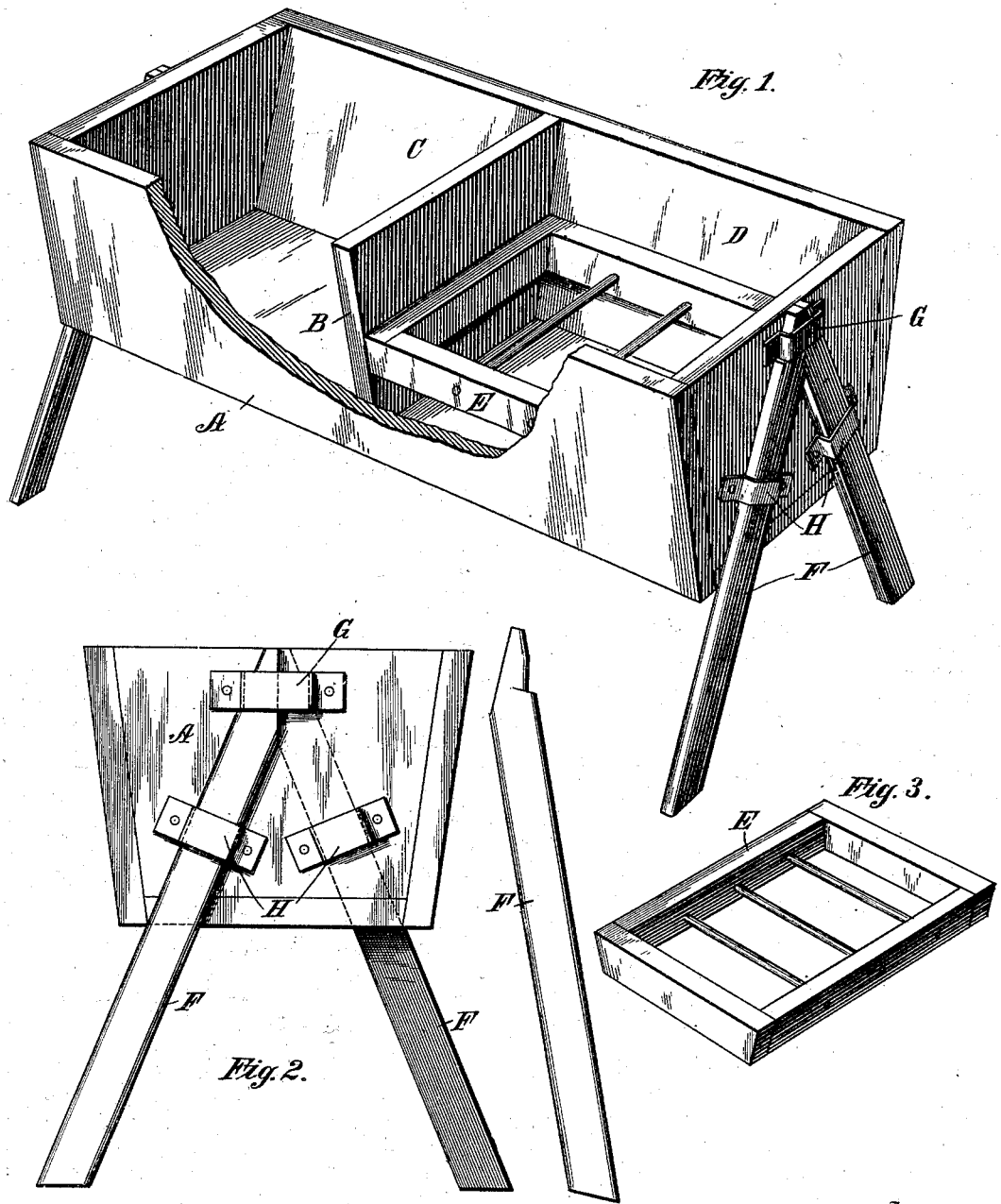

No. 749,717. Patented January 19, 1904.

UNITED STATES PATENT OFFICE.

THEOPHILUS LUKE CARPENTER, OF HUSTONVILLE, KENTUCKY.

FEED-TROUGH.

SPECIFICATION forming part of Letters Patent No. 749,717, dated January 19, 1904.

Application filed June 29, 1903. Serial No. 163,646. (No model.)

*To all whom it may concern:*

Be it known that I, THEOPHILUS LUKE CARPENTER, a citizen of the United States, residing at Hustonville, in the county of Lincoln and State of Kentucky, have invented certain new and useful Improvements in Feed-Troughs; and I do hereby declare the following to be a full, clear, and exact description of the invention, such as will enable others skilled in the art to which it appertains to make and use the same.

My invention relates to feed-troughs for live stock; and its principal objects are, first, to provide a simple and convenient portable trough at which a horse or mare and colt may feed at the same time, with means for preventing the mare from getting at the colt's feed, and, second, to provide detachable legs therefor, with improved means for fastening and bracing them to the body of the trough, so that the legs may be easily attached or detached to permit the trough to occupy little space for storing or shipping.

The invention will first be described with reference to the accompanying drawings, which are to be taken as a part of this specification, and its distinguishing features will then be pointed out more particularly in the claims following the description.

In said drawings, wherein corresponding parts in the several figures are indicated by the same characters of reference, Figure 1 is a perspective view of a feed-trough embodying my invention with a part of the front side broken away to disclose the interior. Fig. 2 is an end view of the trough with one of the supporting-legs detached and disposed at the side of said figure, and Fig. 3 is a detail perspective view of the grate which fits in the colt's feed box or receptacle.

The body of the trough, which is designated in the drawings by the letter A, may be of any desired construction. As shown, it consists of downwardly-converging front and back members, a bottom, and end members. The trough is divided by a transverse partition B into two receptacles or feed-boxes C and D, the first of which is for the horse's feed and the latter for that of the colt. In the colt's feed-box, a suitable distance above the bottom thereof, is placed a removable grate E, formed to fit tightly within the receptacle or between the front and back members of the trough, its frame being therefore in this instance of rectangular form with its opposite sides downwardly inclined, as shown in Fig. 3. The grate prevents the mare from disturbing the colt or getting at its feed, the spaces between the bars or rods of the grate being sufficiently large for the colt, but too small for the mare.

The trough may be mounted on removable supporting-legs, (designated by the letter F,) two at each end, which are fastened and braced to the ends of the trough without the use of bolts, nails, or other inserted fastenings. For this purpose each end of the trough is provided with a horizontally-disposed sleeve G and with two lower obliquely-disposed sleeves H, all of which may consist of U-shaped metal strips suitably fastened to the trough. The supporting-legs at each end, which diverge toward their lower extremities, are passed through the lower sleeves H, and their ends are then brought together in the upper sleeve G, for which purpose the upper ends of the legs may be cut obliquely at confronting parts to fit together and notched at their outer sides to fit within the upper sleeve. Thus the legs may be easily put in place and may be as readily detached when it is desired to store the trough in small space.

This trough is designed particularly for use in the spring after foaling and at weaning-time and should be taken up and stored in a dry place when not in use. The colt's feed-box is intended to contain ship-stuff, oats, shelled corn, or the like, and the grate therein may be removed for cleaning out the receptacle. The trough is exceedingly simple, efficient, and convenient and is portable and may be moved from place to place to avoid tramping out the grass. In some cases more than two feed-receptacles may be provided, though the construction described is usually preferred.

Having thus fully described my invention, what I claim as new, and desire to secure by Letters Patent of the United States, is—

1. A feed-trough of the character described having separate feed-receptacles for a horse and colt, and a grating in the colt's receptacle having spaces to admit the colt but not the horse.

2. A feed-trough of the character described having a partition dividing it into separate feed-receptacles for a horse and colt, and a removable grating closely fitted in the colt's receptacle having spaces to admit the colt but not the horse.

3. A feed-trough of the character described having separate feed-receptacles for a horse and colt, and a removable grating fitted within the colt's receptacle near the bottom thereof and having spaces to admit the colt but not the horse.

4. A feed-trough of the character described consisting of a rectangular box or receptacle having downwardly-converging front and back members and a partition dividing it into separate feed-boxes or compartments for a horse and colt, and a removable grating in the colt's receptacle comprising a frame fitted therein with its front and back sides similarly downwardly inclined and bars or rods forming spaces to admit the colt but not the horse.

5. As a new article of manufacture, a feed-trough of the character described having separate feed-compartments for a horse and colt, with a removable grating in the colt's compartment having spaces to admit the colt but not the horse, and detachable supporting-legs for said trough.

6. As a new article of manufacture, a feed-trough of the character described having separate feed-compartments for a horse and colt, with a removable grating in the colt's compartment having spaces to admit the colt but not the horse, and the herein-described detachable supporting-legs, two at each end diverging downwardly, a sleeve into which the upper ends of each pair of legs are inserted together, and lower obliquely-disposed sleeves in which the legs are separately fitted.

In testimony whereof I affix my signature in presence of two witnesses.

THEOPHILUS LUKE CARPENTER.

Witnesses:
J. W. HOCKER,
W. G. COWAN.